US009173374B2

(12) United States Patent
Hovsepian

(10) Patent No.: US 9,173,374 B2
(45) Date of Patent: Nov. 3, 2015

(54) SMALL ANIMAL CARRIER FOR MOUNTING ON OR IN VEHICLES

(71) Applicant: Richard W Hovsepian, Santa Barbara, CA (US)

(72) Inventor: Richard W Hovsepian, Santa Barbara, CA (US)

(*) Notice: Subject to any disclaimer, the term of this patent is extended or adjusted under 35 U.S.C. 154(b) by 90 days.

(21) Appl. No.: 13/763,694

(22) Filed: Feb. 10, 2013

(65) Prior Publication Data

US 2013/0220231 A1 Aug. 29, 2013

Related U.S. Application Data

(60) Provisional application No. 61/596,793, filed on Feb. 9, 2012.

(51) Int. Cl.
*A01K 31/07* (2006.01)
*A01K 1/02* (2006.01)

(52) U.S. Cl.
CPC ............ *A01K 1/0272* (2013.01); *A01K 1/0281* (2013.01)

(58) Field of Classification Search
CPC . A01K 1/0236; A01K 1/0245; A01K 1/0263; A01K 1/0272; A01K 1/0281
USPC ......... 119/453, 496, 497, 498, 499, 501, 473, 119/771, 671, 678; 190/112, 113, 100; 248/503, 499, 510, 352, 354.3–354.5
IPC ...................................... A01K 1/02, 1/03, 31/07
See application file for complete search history.

(56) References Cited

U.S. PATENT DOCUMENTS

| 3,625,405 | A | * | 12/1971 | Kezar et al. | 224/413 |
| 4,266,703 | A | | 5/1981 | Litz | |
| 4,440,331 | A | | 4/1984 | Schimmels | |
| D276,713 | S | | 12/1984 | Schacter | |
| 4,501,384 | A | | 2/1985 | Itoh | |
| 4,588,114 | A | * | 5/1986 | Lebaron et al. | 224/435 |
| 4,690,237 | A | | 9/1987 | Funabashi | |
| 4,781,147 | A | * | 11/1988 | Delino, Jr. | 119/453 |
| 5,144,910 | A | * | 9/1992 | Darby | 119/496 |
| 5,577,646 | A | | 11/1996 | White | |
| 5,810,227 | A | | 9/1998 | Jorgensen | |
| 5,832,874 | A | | 11/1998 | Ravin | |
| 6,354,476 | B1 | * | 3/2002 | Alderman | 224/413 |
| 7,421,978 | B2 | * | 9/2008 | Price | 119/671 |
| 7,628,120 | B2 | * | 12/2009 | Beeler | 119/496 |
| 7,717,062 | B2 | * | 5/2010 | Kline | 119/28.5 |
| 2010/0288205 | A1 | * | 11/2010 | Makarian et al. | 119/671 |
| 2011/0017147 | A1 | * | 1/2011 | Petruzzi | 119/604 |
| 2011/0037277 | A1 | | 2/2011 | Visenzi | |

FOREIGN PATENT DOCUMENTS

DE 19739179 A1 * 3/1998 ............... B60R 7/00

* cited by examiner

*Primary Examiner* — Lisa Tsang
(74) *Attorney, Agent, or Firm* — Guy Cumberbatch

(57) ABSTRACT

A detachable carrier for small pets that can be attached to vehicles, such as bicycles, motorcycles, motor scooters, ATV's, golf carts or watercraft. The carrier allows not only for the transportation of the pet, but also for the enjoyment of the ride, by way of an open top hatch through which the pet can extend its head allowing for an "open air" ride and visibility. The carrier for transporting a small pet on a vehicle includes a box-like container provided with an upper opening that forms part of the container top. The opening has padded edges and is large enough so that an animal such as a dog can stand up in the container with his/her front legs on the padded front edge. Anchoring structure on the container bottom is arranged to detachably couple to a luggage rack or support plate on a luggage rack that is mounted on the vehicle.

14 Claims, 15 Drawing Sheets

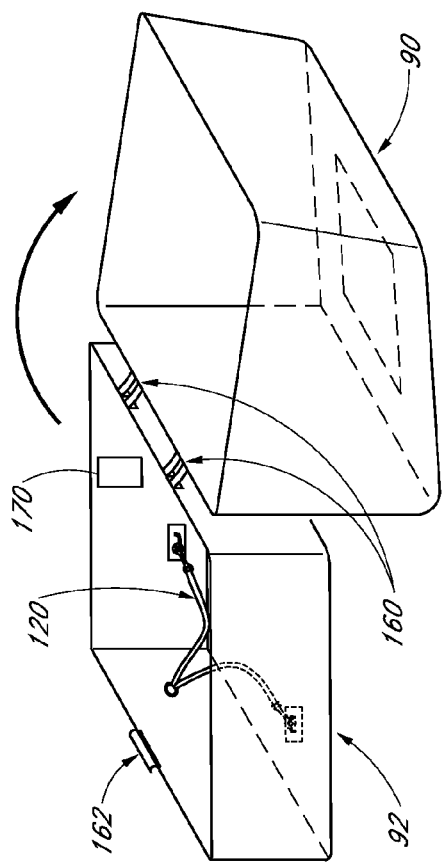
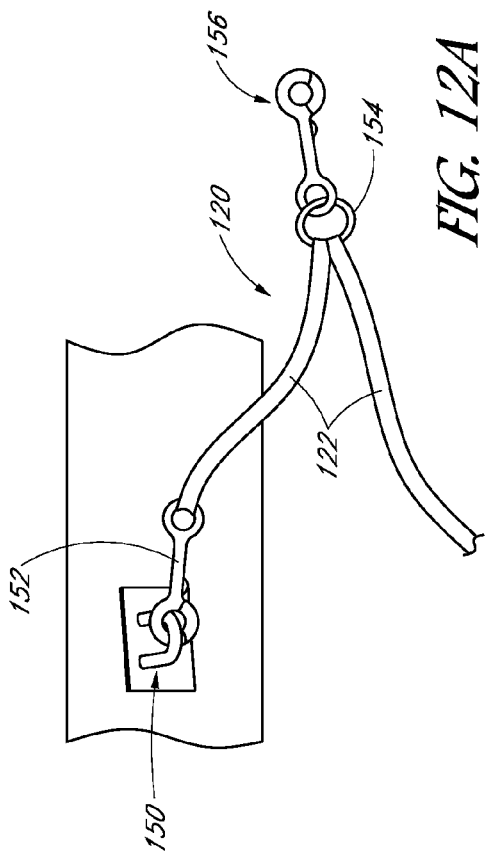
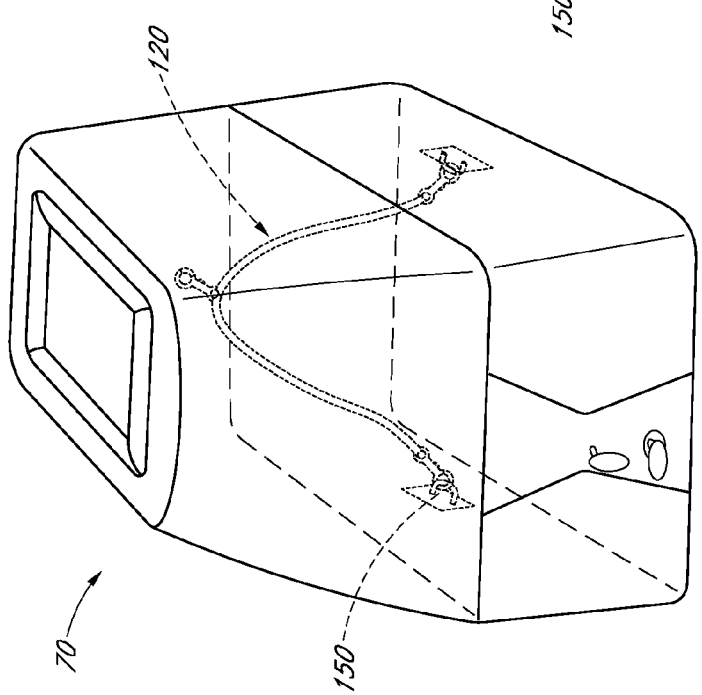
FIG. 12
FIG. 12A
FIG. 13

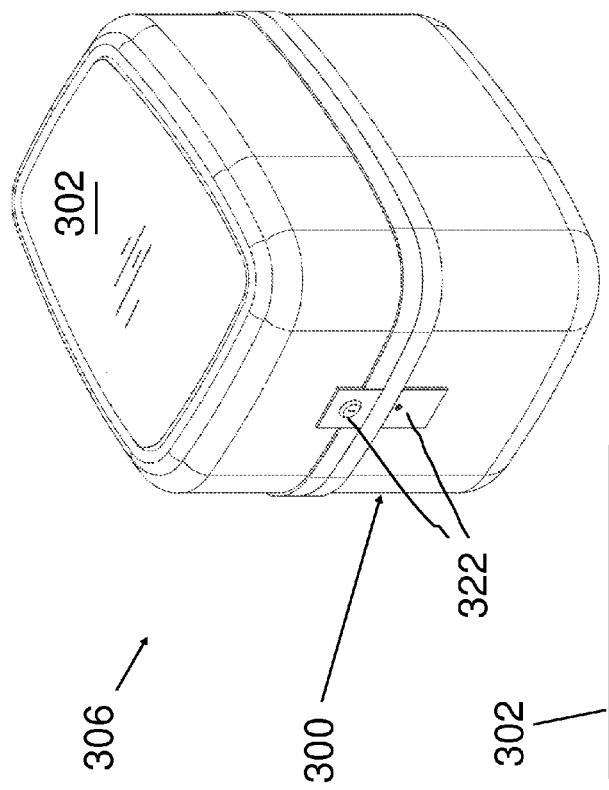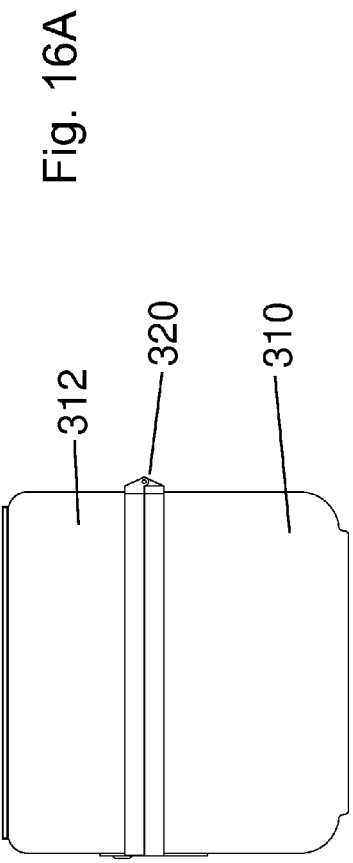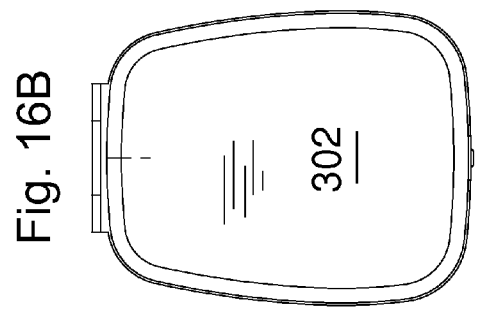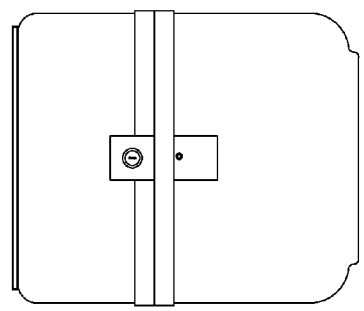

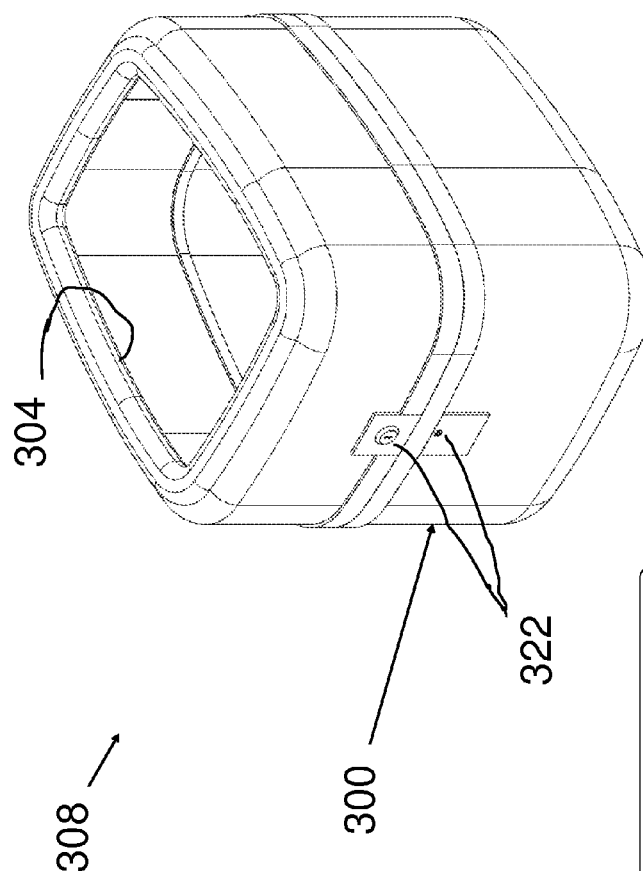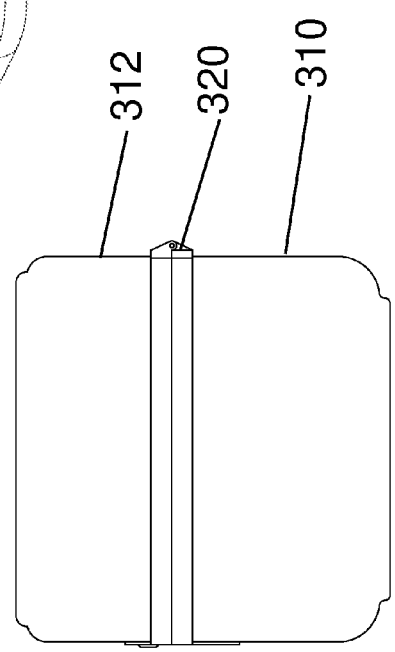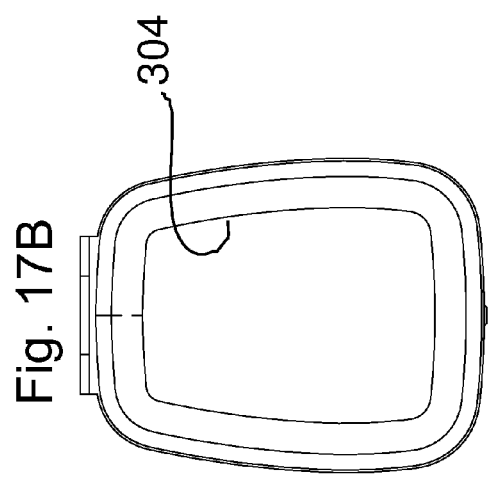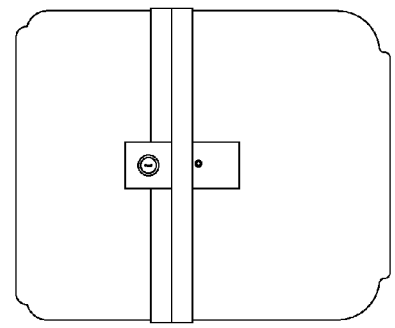

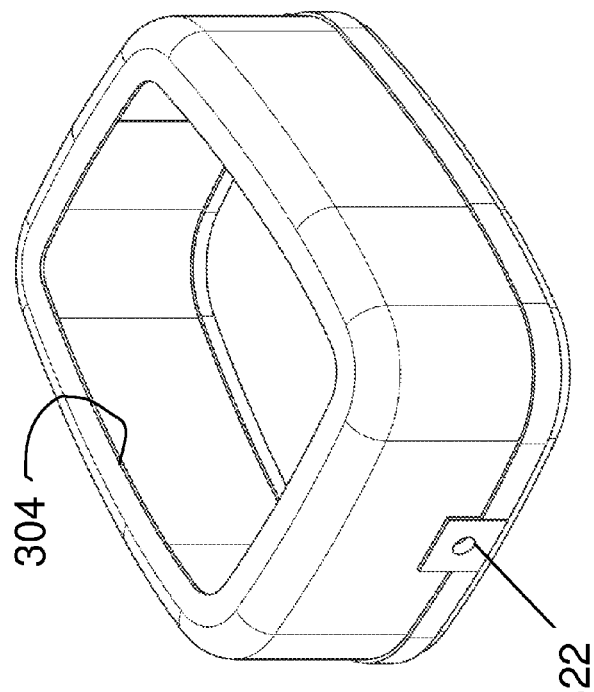
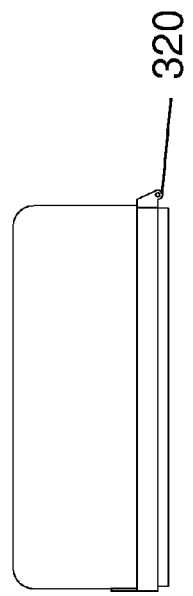
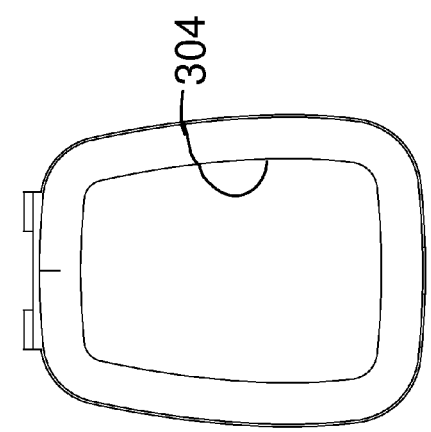
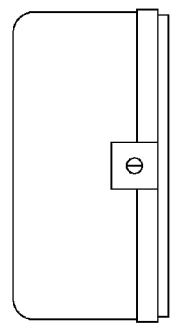

SMALL ANIMAL CARRIER FOR MOUNTING ON OR IN VEHICLES

RELATED APPLICATIONS

The present application claims priority under 35 U.S.C. 119 to U.S. Provisional application No. 61/596,793, filed Feb. 9, 2012, the disclosure of which is incorporated by reference herein.

FIELD OF THE INVENTION

The present invention relates to a carrier for small pets that detachably mounts to a vehicle, such as behind the seat and over the rear wheel of a motorized two-wheel vehicle.

BACKGROUND OF THE INVENTION

Many kinds of specialized carriers have been developed for use with bicycles and motorcycles. Typically, such carriers are mounted above the rear wheel behind the rider. Some are arranged to carry packages and merchandise, and others to carry an infant or small child. An example of the first type is shown in U.S. Pat. No. 4,266,703 to Litz. That patent describes a luggage box having tongued rails on its underside that are arranged to interlock with grooves in a plate mounted to the frame of a motorcycle just back of the rider's seat. The rails have a locking means to secure the luggage box to the motorcycle frame plate, and to allow its convenient removal from the cycle.

An example of the second type of carrier is shown in a patent to Schimmels, U.S. Pat. No. 4,440,331. That patent describes a carrier assembly for transporting a child on a bicycle. It is arranged to detachably lock onto a bracket fixed above the rear wheel of a bicycle, or to be secured to a vehicle seat to provide protection during auto transport.

There has also been a suggestion in the art to provide means for transporting a pet on a bicycle. Such carrier devices are shown in U.S. Design Pat. No. D276,713, U.S. Pat. Nos. 5,577,646, 5,810,227, and 5,832,874. Each of these designs suffers from certain drawbacks.

Despite the wide variety of specialized carriers that have been developed over the years, there remains a need for a safe carrier to transport small to medium sized pets which allows the pet more freedom to observe the scenery and which is more easily mounted on and dismounted from a vehicle.

SUMMARY OF THE INVENTION

The present application provides a carrier for transporting a small pet on a vehicle including a box-like container provided with an upper opening that forms part of the container top. The opening has padded edges and is large enough so that an animal such as a dog can stand up in the container with his/her front legs on the padded front edge. Anchoring structure on the container bottom is arranged to detachably couple to a rack such as a luggage rack, or to a support plate on a luggage rack, that is mounted on the vehicle. On scooters, for example, the luggage rack mounts above the rear wheel on a rear platform. If using a support plate, it may be one which is supplied with an off-the-shelf locking top box for storing belongings such as a helmet.

In one preferred embodiment, an animal carrier for use with a vehicle comprises a container having a bottom and sides sized to contain a dog, and having a top wall with an upper opening therein. The upper opening has a size to permit the dog to stick its head out and has generally horizontal edges that extend inward all the way around the periphery of the opening from the sides of the container. A harness attaches within the container to retain the dog within the container interior. The bottom of the container has anchoring structure adapted to detachably couple the container to a vehicle-supported rack.

Desirably, the edges of the upper opening are covered with padding. The container may have a height of about 12-16 inches from a floor inside the container to a front edge of the opening. In one version, the container has a clamshell configuration with an upper half pivotally mounted about a front edge on a lower half, and locking structure may be provided between the upper and lower halves. In a preferred embodiment, a top panel detachably mounts within the upper opening to convert the animal carrier to a luggage box, the panel being secured from the inside of the container.

The anchoring structure may include latching structure on the container bottom adapted to detachably couple the container to a top box support plate and including a quick-release latch that permits a user to detach the carrier from the top box support plate by actuating the quick-release latch. One option is to including a seatbelt loop on the exterior of the carrier enabling the carrier to be secured within a vehicle interior with a seatbelt.

A further animal carrier for use with a vehicle that has a top box support plate secured thereto comprises a container having a bottom and sides sized to contain a small to medium dog and having a top with an upper opening defined by edges. Latching structure on the container bottom is adapted to detachably couple the container to a top box support plate and includes a quick-release latch that permits a user to detach the carrier from the top box support plate by actuating the quick-release latch.

Another animal carrier for use with a vehicle disclosed herein comprises a molded container having a bottom and sides sized to contain a dog and having a top wall with an upper opening therein. The upper opening has a size to permit the dog to stick its head out and padding on the edges of the opening. The bottom of the container having a series of apertures for coupling the container to a vehicle-supported rack. A harness attaches within the container to retain the dog within the container interior. Finally, a top panel detachably mounts within the upper opening to convert the animal carrier to a luggage box, the panel being secured from the inside of the container.

One method disclosed herein is for replacing a vehicle luggage carrier with a small animal carrier, and vice-versa. The method includes first removing the luggage carrier from a support plate that is secured to the vehicle by actuating a quick-release latch and lifting the luggage carrier off of the support plate. A pet carrier attaches to the support plate by engaging latching structure on the bottom of the pet carrier with the support plate. The pet carrier has a container with a bottom and sides sized to contain a small to medium dog or other such domestic animal and having a top with an upper opening through which the dog or other animal can poke his/her head. Finally, the pet carrier is removed from the support plate by actuating a quick-release latch and lifting the pet carrier off of the support plate, and the luggage carrier re-attached to the support plate, engaging latching structure on the bottom of the luggage carrier with the support plate.

Another method disclosed herein enables conversion between a vehicle luggage box and a small animal carrier, and vice-versa. The method includes removing an upper panel from an upper opening in a luggage box to form a pet carrier, the pet carrier having a container with a bottom and sides sized to contain a small to medium dog or other such domestic animal and having a top with an upper opening through which the dog or other animal can poke his/her head. A pet harness is attached within the container of the pet carrier. Conversely, attaching the upper panel to the upper opening in the pet carrier converts it back to a luggage box.

BRIEF DESCRIPTION OF THE DRAWINGS

Features and advantages of the present invention will become appreciated as the same become better understood with reference to the specification, claims, and appended drawings wherein:

FIG. 12 is a perspective view of the small animal carrier similar to FIG. 7 but showing an exemplary internal harness system in phantom, and FIG. 12A is a close-up view of an exemplary harness system;

FIG. 13 is a perspective view of a clamshell-type container that may be used to form the small animal carriers described herein;

FIGS. 16A-16D are various views of another small animal carrier with an upper door assembled over an upper opening so as to form a luggage box;

FIGS. 17A-17D are various views of the small animal carrier of FIGS. 16A-16D with the upper door removed from the upper opening so as to convert the luggage box into the animal carrier;

FIGS. 19A-19D are various views of an upper half of the small animal carrier of FIGS. 16A-16D.

DETAILED DESCRIPTION OF THE PREFERRED EMBODIMENTS

Figure 1:
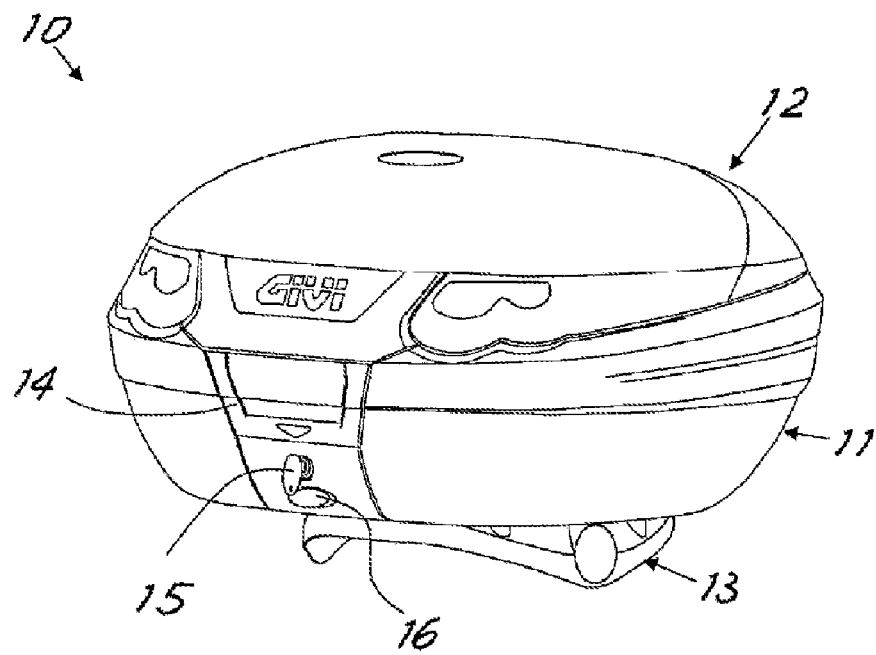
FIG. 1 is a schematic perspective view of a "top case" of the prior art, coupled with a support plate for fastening to a motorcycle.

The present invention pertains to carriers for pets or other small animals. A "small animal carrier" or "pet carrier" refers to essentially the same thing, and though it is conceivable that a small animal that is not a pet could be transported by the carriers disclosed herein, most likely the animal is a pet such as a dog or cat. The carriers herein are therefore sized to contain a small to medium dog or other such domestic animal.

The present pet carrier desirably mounts to a rack such as a luggage rack of a vehicle, bicycle, scooter, or motorcycle. The term "vehicle" will be used herein to refer to all variations of devices for transport on which a pet carrier may be mounted, whether they be wheeled or otherwise. For example, the pet carrier could even be mounted on watercraft such as wave runners. The carrier may conveniently mount to existing hardware provided with an off-the-shelf luggage carrier, such as the type referred to most commonly as a "Top Box" or "Top Case." More specifically, such Top Cases usually feature a lockable luggage carrier for helmets and the like which mounts to the rear of a motorized cycle. The carrier itself mounts to a support plate which is secured to the rear end of the cycle, such as to a rear luggage rack with rails. A mechanism below the luggage carrier latches to the support plate in such a way that it can easily be removed, though the support plate is typically bolted to the cycle and remains. The pet carriers of the present application may include a similar latching structure on their undersides which allows them to be secured to the existing support plate in place of the off-the-shelf luggage carrier. More details will be explained below.

An exemplary top case is shown in U.S. Patent Publication No. 2011/0037277, which is assigned to Givi S.R.L., certain components of which are shown in FIGS. 1-5 as described below. The US 2011/0037277 publication describes features of the MONOKEY® system found in the Givi E55 TECH 55 Liter case and the V46 TECH 46 Liter case. The MONOKEY® system allows the user to open and detach the motorcycle case from the fixing plate by means of one key. The four top manufactures of such Top Cases are Givi S.R.L. of Brescia, Italy, Coocase based in Singapore, Bestem USA of Tucker, Ga., and Piaggio & C. S.p.A., based in Pontedera Italy.

Aspects disclosed in U.S. Patent Publication No. 2011/0037277 regarding an exemplary latching mechanism for securing the top cases to the support plate that are applicable to the pet carrier herein are expressly incorporated herein by reference. Likewise, those of skill in the art will understand that the particular latching mechanism utilized may be modified per other top case latching systems, and the pet carriers may be provided with a number of different choices of latching mechanisms so as to mate with support plates of different manufacturers. Still further, the pet carrier may be sold with a mating support plate if the buyer does not already own a top case with its accompanying support plate.

With reference to FIG. 1, a top case 10 suitable for coupling with motor vehicles includes any suitable type of container (i.e., luggage carrier) equipped with a body and a cover hinged together. The type shown is formed from a bottom shell 11 that makes the body of the case and a top shell 12 that makes the cover and hinged at the back to the bottom shell. The case is equipped at the bottom with a rigid base on which there are conventional means for removably attaching to a support plate 13 fixed to the motor vehicle. As shall become clear hereafter the attachment means generically comprise passive couplings, for example using a clasp, and a latch locking system, able to be actuated to allow a disengagement movement of the case from the passive couplings and allow the case to be removed from the plate.

The case is equipped with a handle 14, which advantageously also makes thrusting means to actuate the opening of the cover, a key lock 15 and a button to release the case from the plate. Advantageously, the lock itself 15 can manage both the opening of the cover and the release button. Between cover and base there is a locking mechanism able to be controlled with suitable control means to move it from a first position holding the cover in closed position to a second position releasing the cover to allow it to be opened.

Figure 2:
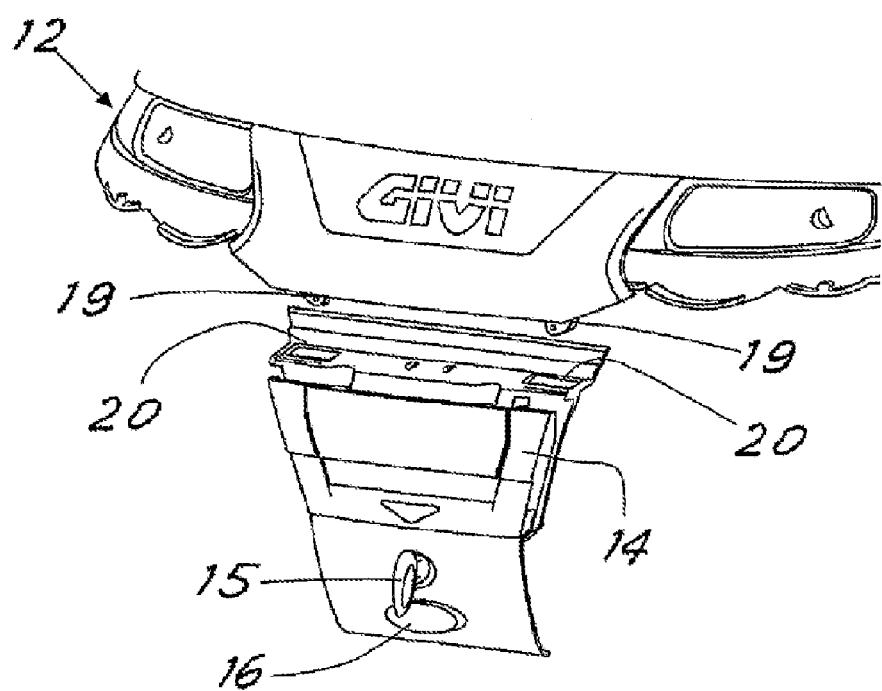
FIG. 2 is a partial schematic view of the case of FIG. 1 that shows the cover of the top case in partially raised position.

FIG. 2 shows a detail of the area of the lock, with the cover slightly open. In such a figure on the cover 12 it is possible to see a pair of hooks 19 that insert into suitable passages 20 on the edge of the bottom shell of the case to be suitably engaged by the locking mechanism.

Figure 3:
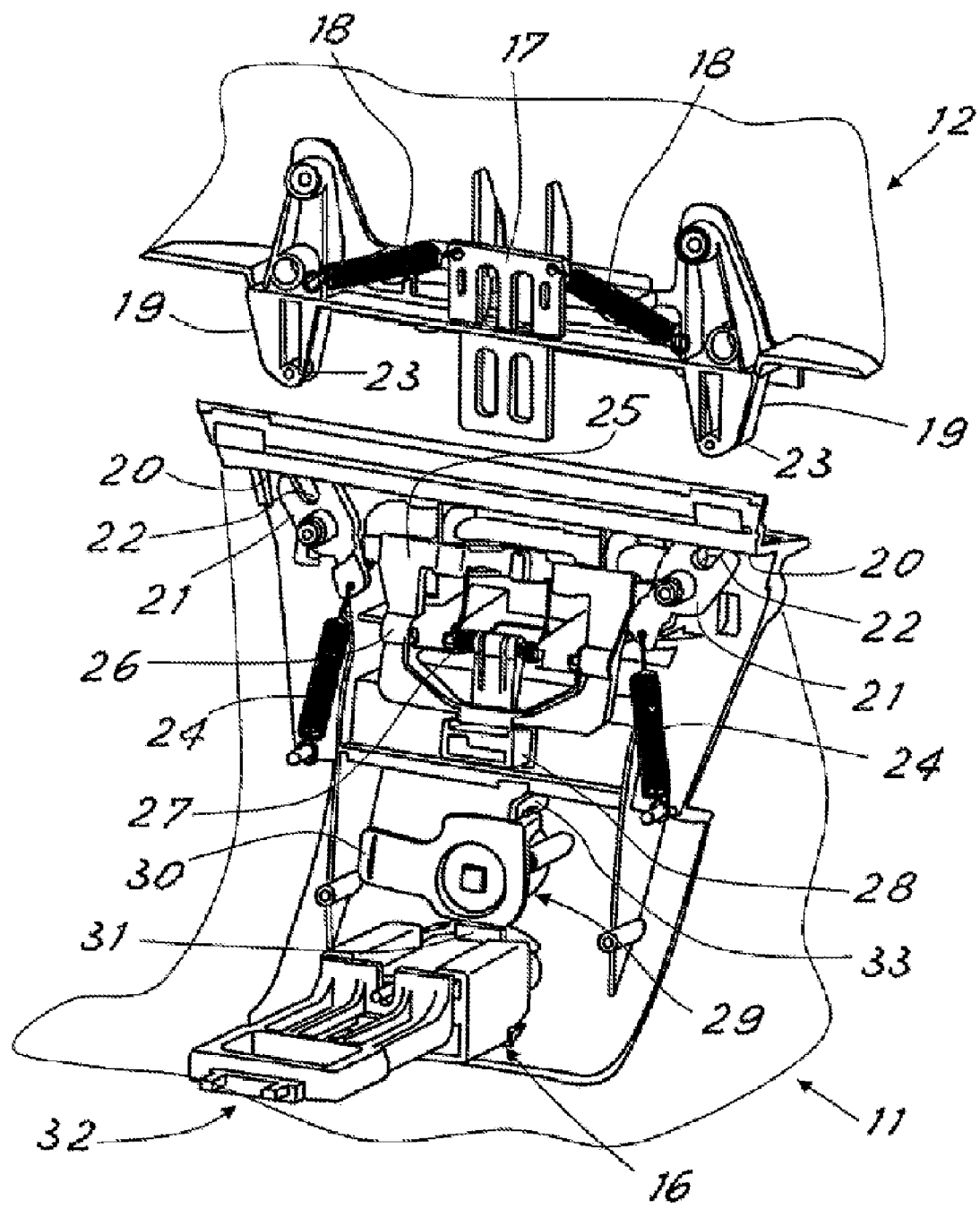
FIG. 3 is a partial schematic view from the inside of the lock mechanism of the top case in open condition.

In FIG. 3 such a closing mechanism is shown, from the inside of the case, together with the part of the mechanism present in the cover and equipped with hooks 19. In the figures possible protections that make the inside of the case and that protect the mechanisms have been removed. The locking mechanism comprises means 21 for partially shifting the cover from the base part that act positively on the closed cover at the passage of the locking mechanism from the holding position to the release position.

The shifting means comprises one or two rotation levers (or rotating forks) 21 oppositely inclined upwards and with open slots 22 that are intended, when the cover is closed, to each receive the bottom end of a respective clasp 19 (shaped with a suitable horizontal pin 23). When the cover is closed the hooks 19 rotate the levers 21 in a mirroring fashion, against the action of springs 24, to push them towards a horizontal locking position.

From FIG. 3 it is clear how such a rotation of the levers 21 is then maintained by a stop element 25 that allows the movement of the levers towards the release position to be locked or unlocked. Advantageously, the stop element is made with a rocker arm element 25 that rotates around a horizontal hinging axis 26, thanks to the action of a spring 27, to lock the return of the levers 21 towards the release position of FIG. 3.

To unlock the levers 21 and to open the cover there are control means that advantageously comprise a presser element 28, pivoted at the same axis 26 as the rocker arm and that rests on the lower arm of the rocker arm to rotate it towards the position not interfering with the levers 21 when it is pushed towards the inside of the case (advantageously through a suitable push on the handle, as shall become clear hereafter).

Advantageously, there are spring means 17, 18 for pushing between cover and base part to increase the shift of the cover once unlocked. In particular, in the advantageous embodiment shown the cover is equipped with a slider 17 that is pushed to elastically project from the edge of the cover by means of springs 18, so as to react against the corresponding edge of the bottom shell of the case. This makes it easier to move the cover open.

From FIG. 3 it can be seen how the lock at the back actuates a rotary bolt 29 that has a radial projection 30 that, with the lock in closed position (not shown), goes into vertical position and prevents the possibility of the presser moving towards the rocker arm and unlocking the levers. The button 16 controls the sliding of a slider or sliding bolt 32 that in rest position holds the case on the plate, as shall be made clear hereafter. In the closed position of the lock he rotary bolt 29 also interferes with a projection 31 present on the back of the button 16, so as to prevent it from moving and, consequently, to prevent the case from releasing from the plate by pressing on the button 16.

Advantageously, the handle 14 for lifting the case can be rotated between a rest position, arranged built flush into the wall of the case, and an operative position only after the release of a suitable stop 33 that, when the lock is in unlocked position, is pushed to elastically bend by means of a projection 34 of the bolt 29. A projection on the stop 33 guides the end of the stop to a release passage 35 located inside the handle 14, so that the handle can rotate around a pivot 36 thereof thanks to the action of suitable spring means (not shown) and go into operative position withdrawn from the case. A known viscous retarder 37 is advantageously present to brake the movement of the springs and to make the movement of the handle better. The handle rests on the presser 28 to actuate it. Advantageously, the release of the handle takes place by rotating the key by an angle slightly greater than its stable open position.

Figure 4:
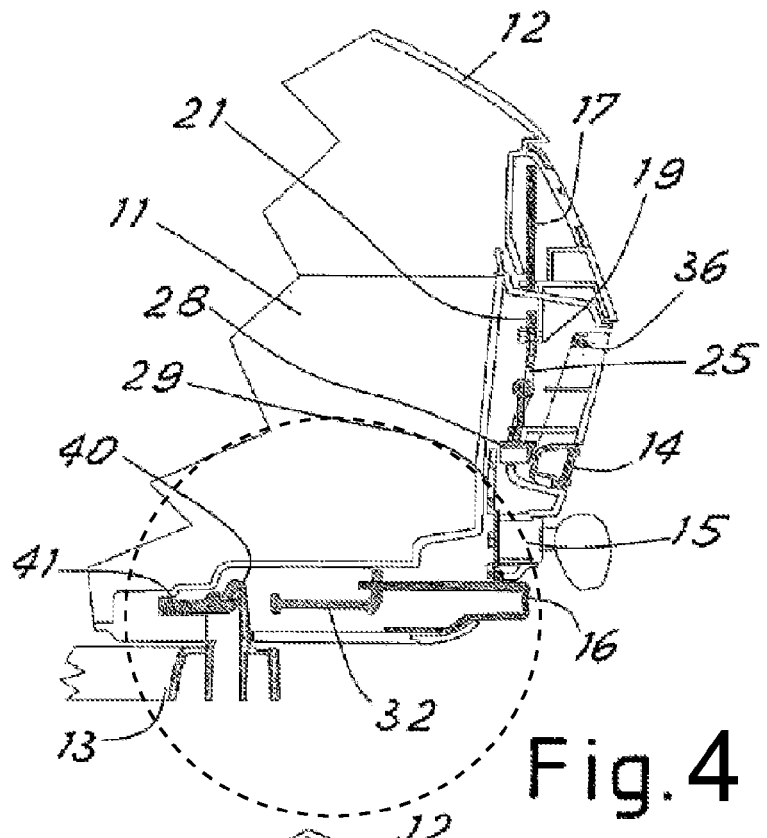
FIGS. 4 and 5 are partial and section schematic views of the case of FIG. 1, with the mechanism for securing the case to the support plate in closed and half-open condition, respectively.
Figure 5:
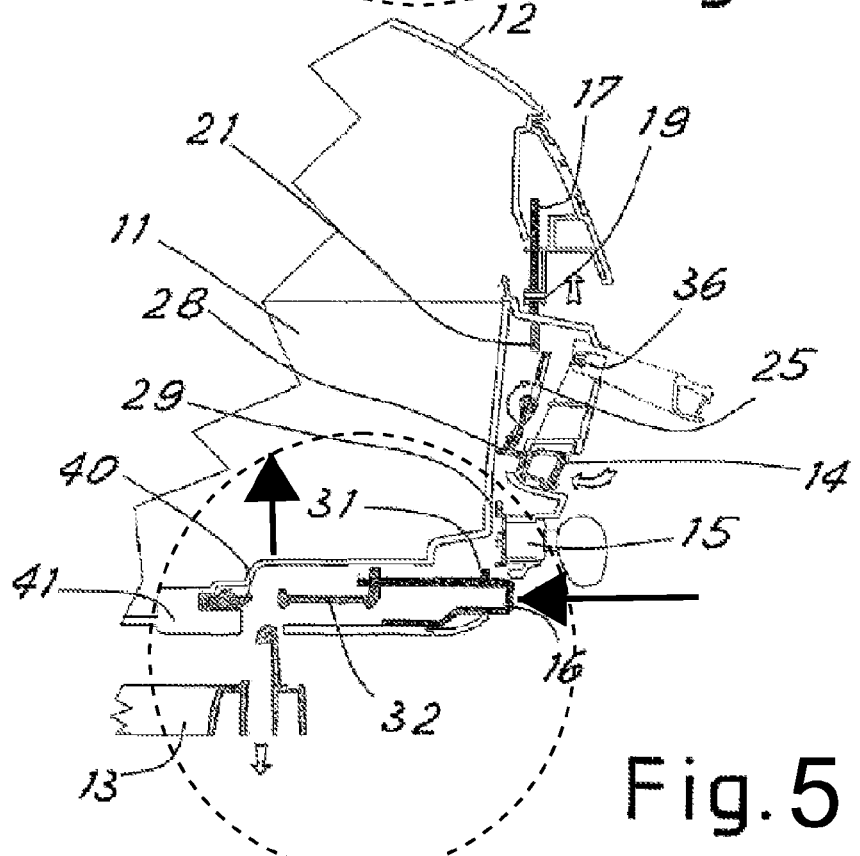

The schematic sections shown in FIGS. 4 and 5 further clarify the operation of the mechanism made according to the principles of the invention. In FIG. 4 the case is in closed condition attached to the support. The support is equipped with passive engagement means at the back of the case (not shown) and with a clasp 40 that engages in the slider 32 pushed by a spring 41. The handle is in rest position, built flush into the wall of the case. In the condition with the lock closed, the rotary bolt 29 has the projection 30 locking the presser 28. Moreover, the button 16 cannot be pressed to release the top case from the support due to the locking of the projection 31. Advantageously, the slider 32 is suitably slideably connected to the button 16 to in any case allow the case to be attached even with the lock closed and the button locked. In order to open the top case it is necessary to turn the key (by 85° in the solution shown) towards the open position of FIG. 3 to allow the rotation of the rocker arm and presser group in this way.

As shown in FIG. 5, it is thus necessary to press in the central area of the handle and in this way the handle rotates towards the inside of the top case and impacting with the presser 28 causes it to rotate. The rotating of the presser causes the same rotation of the rocker arm 25 that, in turn rotating towards the outside in its top part, frees the rotation levers 21 that, under the action of the springs 24 rotate and go from the horizontal position to the vertical position.

Going into vertical position, the levers force the hooks 23, and consequently the cover fixedly connected to it, to move vertically and thus to open the case. In this way a first vertical movement of the cover is generated (equal to about 15 mm in the solution shown). The extent of such movement is determined by the shape of the rotation levers.

In order to make it easier for the cover to open, the slider 17 also intervenes, pushing on the edge of the case and increasing the space between base and cover. At the moment when the cover starts to open, the slider, thanks to the action of the springs 18, cam slide downwards coming out from the cover and, acting upon the horizontal plane of the hinge, pushes the cover further upwards increasing the gap between cover and base (about 30 mm in the embodiment shown) to double to value of that generated by just the action of the rotation levers. If so desired, the gap between base and cover can be increased or decreased by acting upon the size of the levers and of the slider.

With opening complete, removing the pressure from the handle, the presser, the rocker arm and the handle return automatically into the starting position (the same one that they occupy when the hinge is closed), thanks to the action of the spring 27. It is also possible to open the top case by making the handle come out from its seat (turning the key by 90° to unlock it) and then by pressing directly upon the presser, advantageously configured like a press key. The withdrawn operative position of the handle is shown with a broken line in FIG. 5.

In order to close the case it is sufficient to press the cover towards the closed position without needing to act upon any type of linkage. Indeed, by pushing the cover downwards, the bottoms ends of the hooks 19 engage the slots of the rotation levers 21 and force them to rotate downwards. In this rotation movement the rotation levers, thanks to suitable inclined planes, make the rocker arm and presser group rotate until they go back into the closed position. The closing of the case, given the type of mechanism described, can take place without distinction either with the key in closed or open position. In the open lock position (FIG. 5) it is possible to press on the press-key 16 to release the case from the support plate.

Up to now the description of FIGS. 1-5 has been with reference to a prior art Top Case mounting mechanism for securing the luggage carrier to a support plate secured to a motorized cycle. This is useful in understanding an exemplary configuration for mounting the present pet carrier to vehicles, though it should be noted that certain features of the pet carrier are useful independently from the particular mounting means, as will be described.

Figure 6:
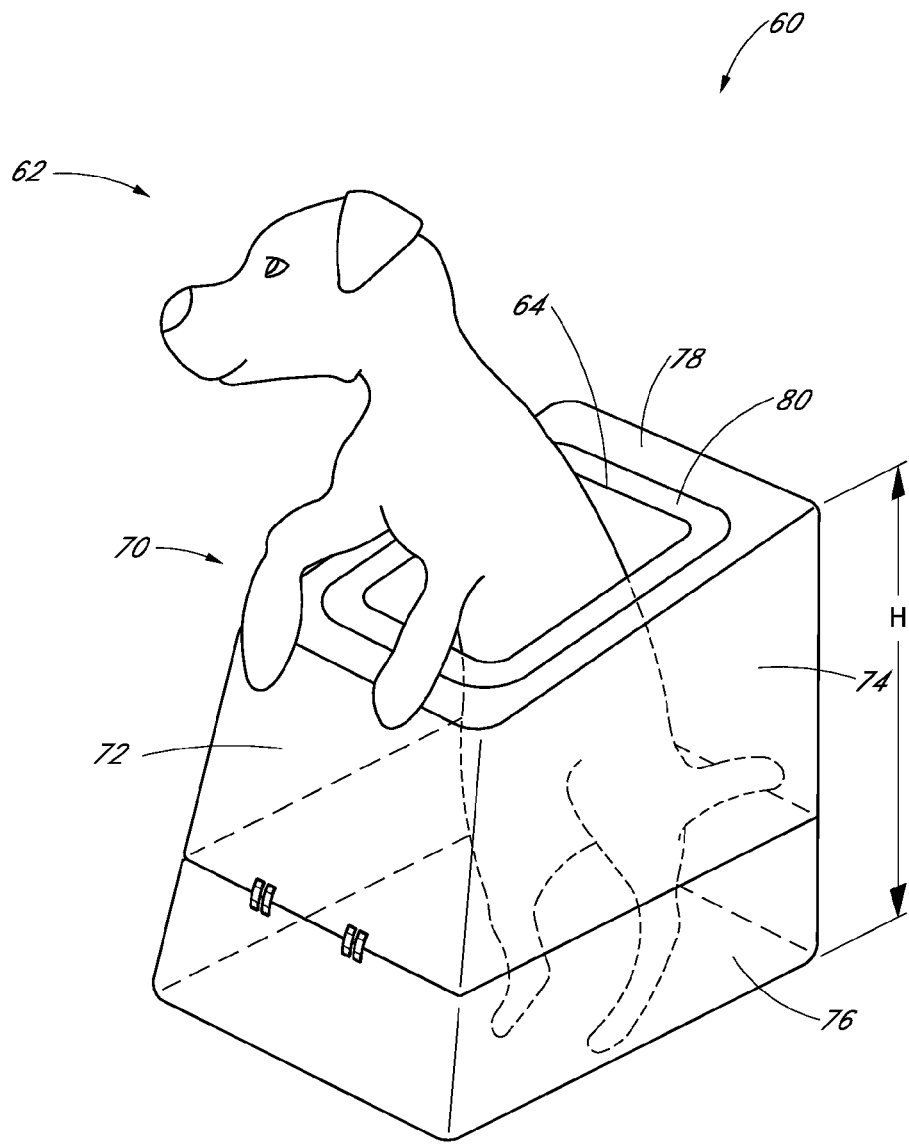
FIG. 6 is a perspective view of an exemplary small animal carrier of the present application for mounting on a vehicle showing a preferred height enabling a pet such as a small dog to project its upper body out of an upper opening.

FIG. 6 illustrates an exemplary small animal carrier 60 of the present application for mounting on various vehicles. The carrier 60 is shown having a preferred height H to enable a pet 62, such as a small dog as shown, to project its upper body out of an upper opening 64. In the exemplary embodiment, the carrier 60 comprises a generally rectilinear container 70 defined by a front wall 72, a rear wall (not shown), two sidewalls 74, a bottom 76, and top wall portions 78 that surround the opening 64. Preferably, the inner edges 80 of the top wall portions 78 are rimmed with padding such as a closed-cell foam. Because of the size of the container 70, the pet 62 can stand on the bottom 76 with its four legs 82 resting on the padded edge 80. In this way, the center of gravity of the pet 62 remains within the container 70, while he/she can enjoy the sights and sounds of the ride from outside the container. Although a rectilinear container 70 is shown, other shapes are contemplated.

Figure 7:
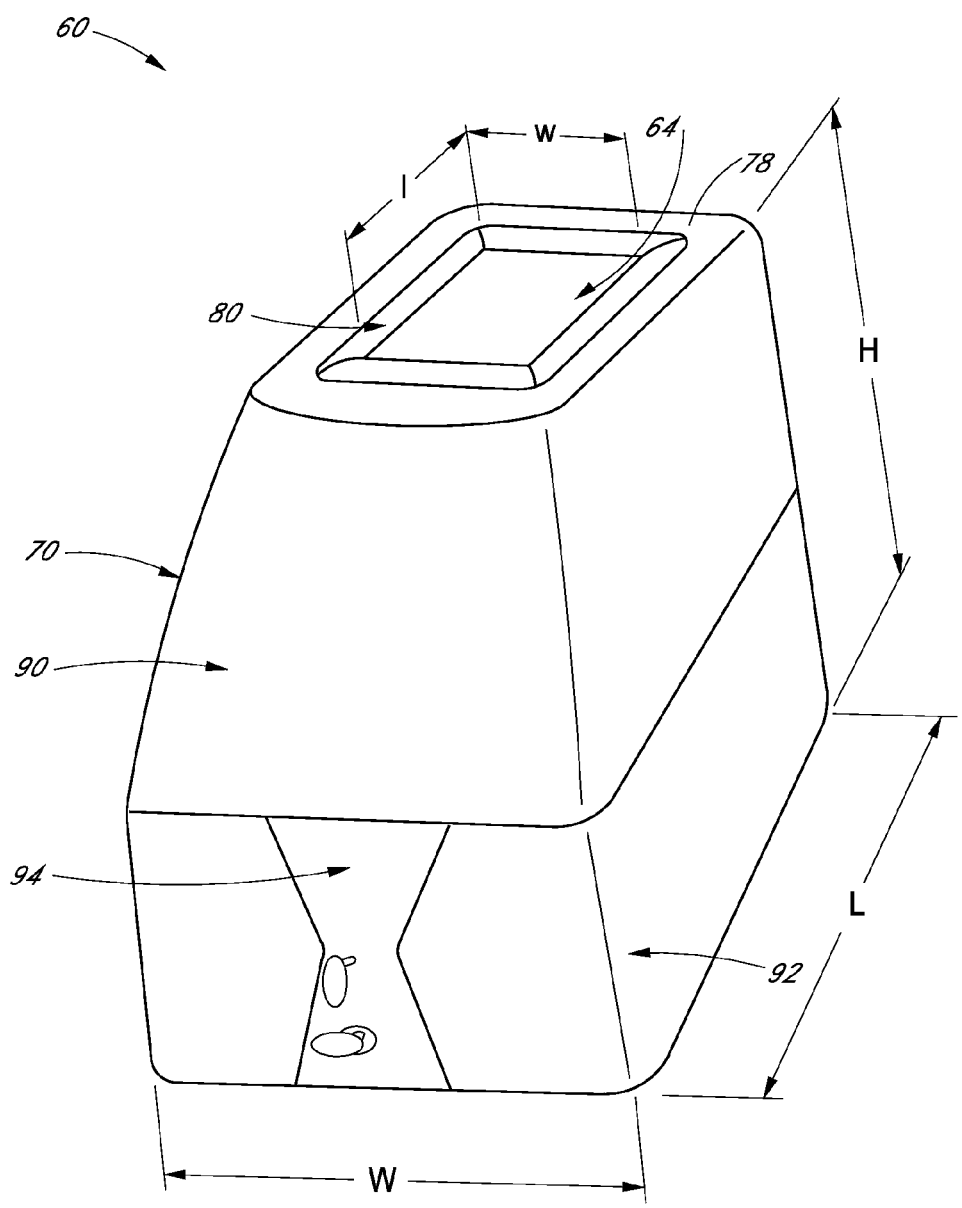
FIG. 7 is a perspective view of the small animal carrier showing a number of exemplary dimensions.

FIG. 7 shows the small animal carrier 60 with the pet removed and with certain preferred dimensions marked. The height dimension H from the bottom 76 to the top wall portions 78 is desirably between about 12-16 inches. A number of carriers 60 may be provided with different heights to accommodate different sized pets. A width dimension W is preferably between 10-12 inches, and more preferably about 11 inches, while a length dimension L may be between 12-18 inches, and preferably is about 15 inches. The upper opening 64 is defined by the top wall edges 80 forming a rectangle having a width dimension w of between 6-8 inches, and more preferably about 7 inches. The length dimension l of the upper opening 64 is desirably between 9-12 inches, and more preferably about 10.5 inches.

In one preferred embodiment, the container 60 comprises a clamshell-type arrangement with an upper half 90 hinged to a lower half 92. The lower half 92 has generally axially-oriented walls, while the upper half 90 tapers slightly inward toward the top walls 78. This helps lower the center of gravity of the entire carrier 60, and also helps constrain the pet from excessive movement. A latch control panel 94 on the front of the lower half 92 preferably includes a latch mechanism therein for both securing the upper half 92 the lower half 92, and for releasably mounting the container 70 to a vehicle-mounted support plate (not shown). An exemplary arrangement for both locking the two shell halves 90, 92 together and for locking the container 70 onto a support plate is described in U.S. Patent Publication No. 2011/0037277 which has previously been incorporated by reference. Of course, if the container 70 is not a clamshell type, the latch control panel 94 may just include a latch mechanism for releasably mounting the container 70 to the support plate. Or, a clamshell type of container 70 could have two separate latches for both the hinged halves and for securing to the support plate.

Figure 8:
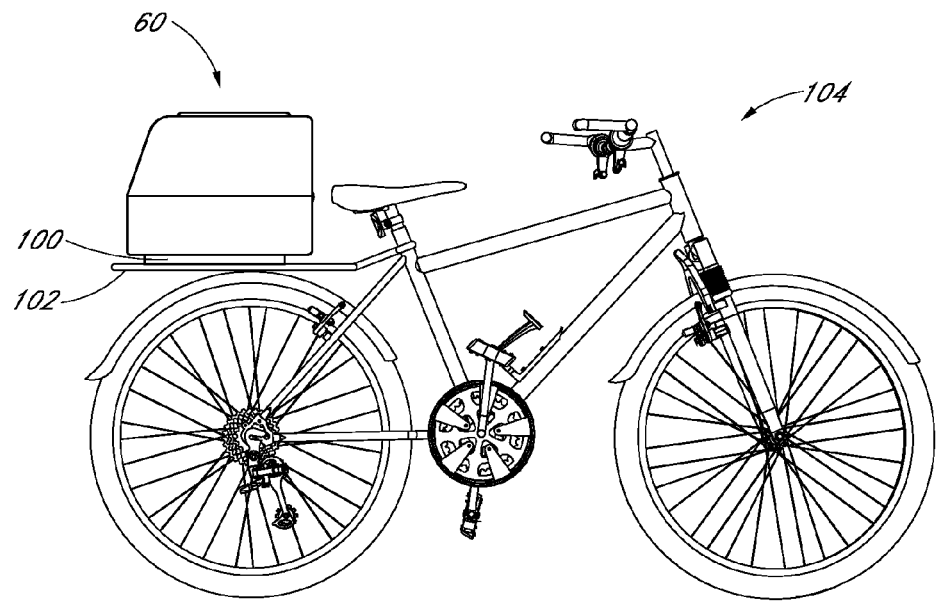
FIG. 8 is a perspective view of the exemplary small animal carrier mounted to a support plate on a rear luggage rack of a bicycle.
Figure 9:
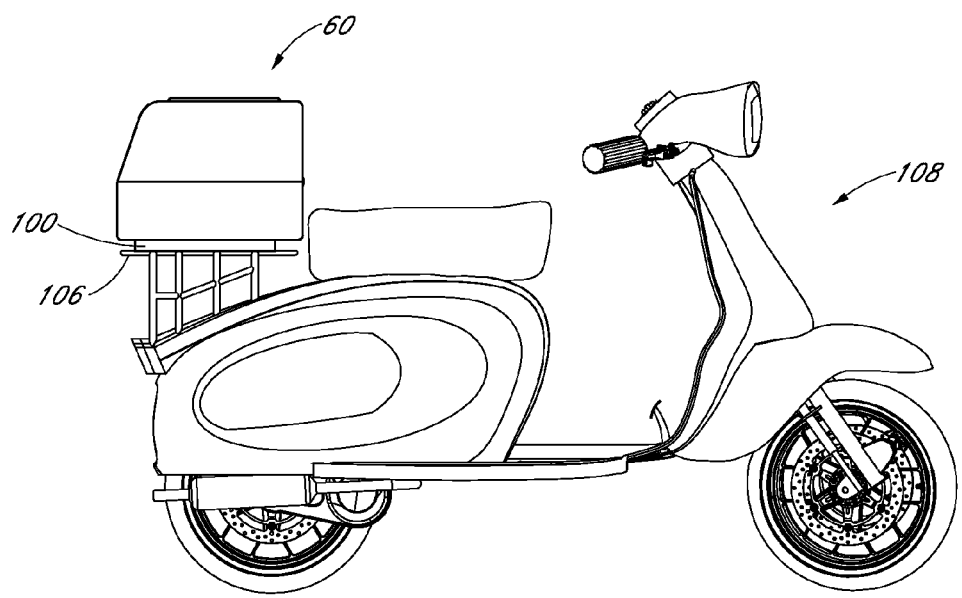
FIG. 9 is a perspective view of the small animal carrier mounted to a support plate on a rear luggage rack of a scooter.
Figure 10:
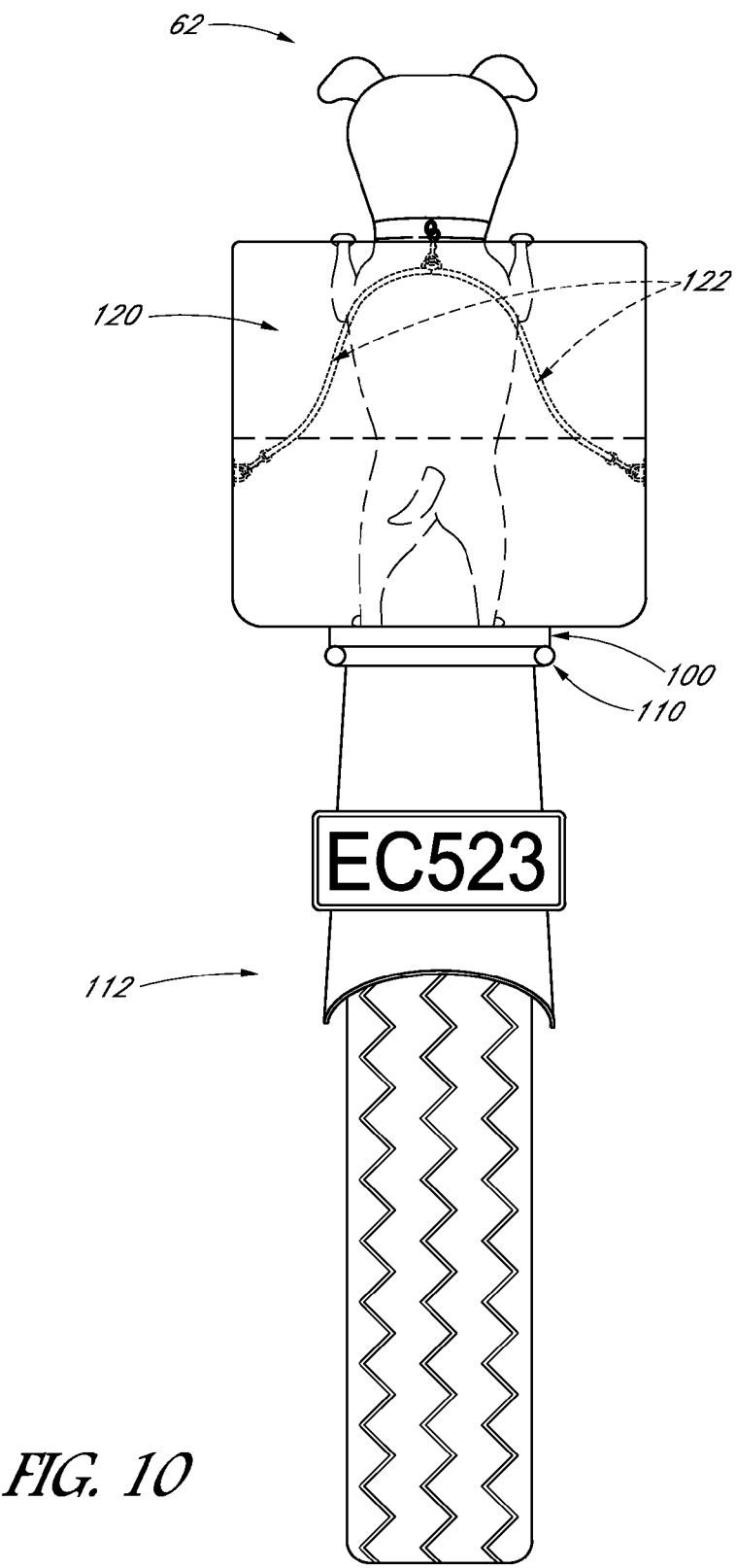
FIG. 10 is a rear elevational view of the small animal carrier maps to a support plate on a rear luggage rack of a motorcycle, with a rear wall of the carrier removed to illustrate a harness system within the carrier.

FIG. 8 shows the exemplary small animal carrier 60 mounted to a support plate 100 on a rear luggage rack 102 of a bicycle 104, while FIG. 9 shows the same components mounted on a rear luggage rack 106 of a scooter 108. Likewise, FIG. 10 shows the carrier 60 mounted to the support plate 100 on a rear luggage rack 110 of a motorcycle 112. The small animal carrier 60 of the present application can be mounted to any number of vehicles on which the support plate 100 can be affixed. For example, with slight modifications such as adding a luggage rack or other such horizontal platform, the carrier 60 can be mounted to a golf cart. Alternatively, as explained below, the small animal carrier 60 can be mounted directly to the luggage racks 102, 110 with appropriate hardware.

Although the small animal carrier is shown in the exemplary embodiments with its bottom mounted over a horizontal support plate 100, a similar arrangement could be provided with the latching mechanism provided on the front wall for coupling with a vertical surface. Those of skill in the art will understand that with minimum modifications, the exemplary pet carriers 60 described herein can be mounted in any number of ways to any number of vehicles.

With reference still to FIG. 10, the rear wall of the carrier 60 is removed to illustrate a harness system 120 for securing the pet. The harness system 120 desirably includes a pair of straps 122 that each attached to an inner sidewall of the container 60, and join together at a clasp or other such clip for connecting to a collar or other such restraint of the pet 62. Further details of an exemplary harness system 120 will be described below.

Figure 11:
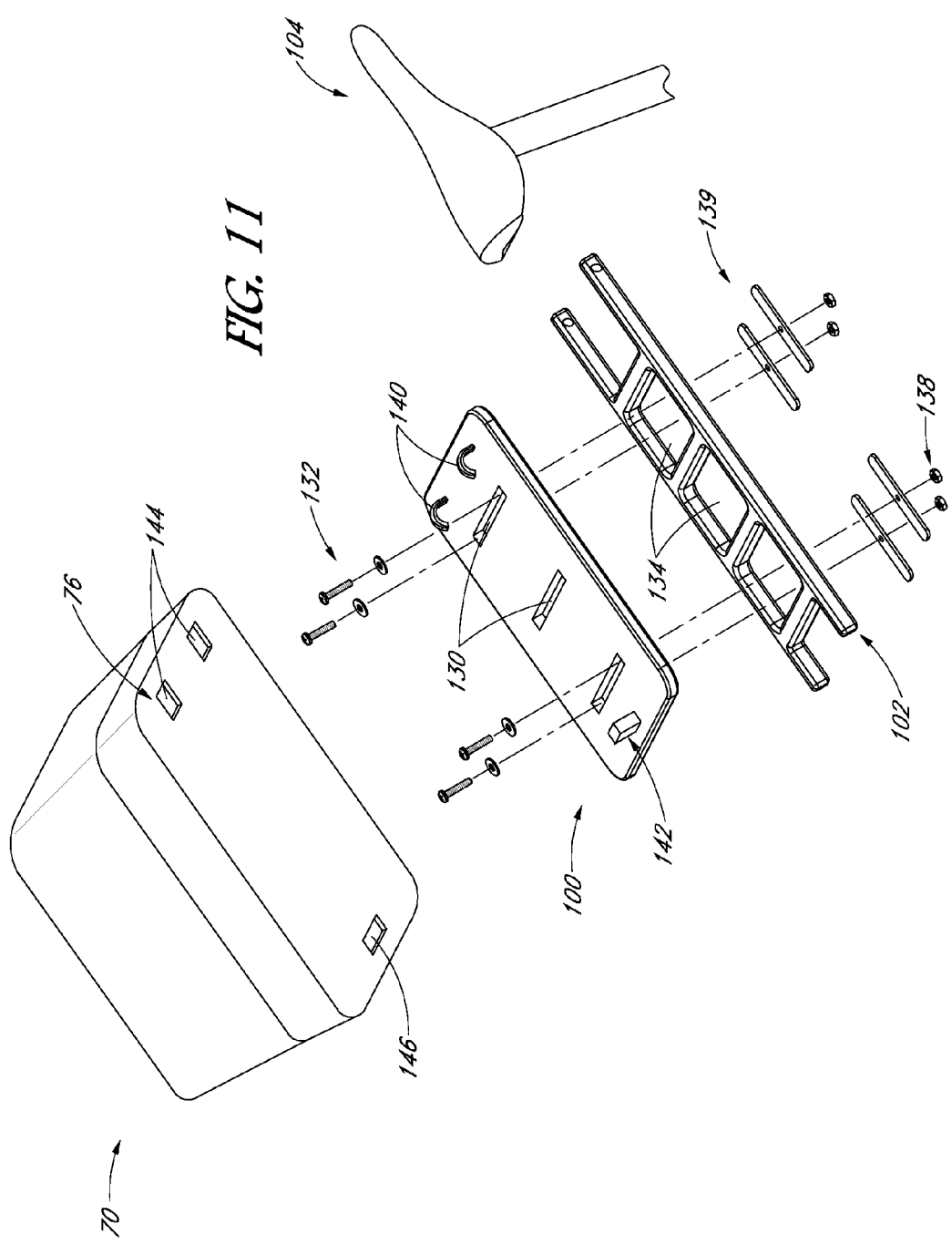
FIG. 11 is an exploded perspective view of one configuration for releasably mounting the small animal carriers described herein to a support plate that can be mounted to a variety of vehicles.

FIG. 11 is an exploded perspective view of one configuration for releasably mounting the carrier container 70 to the support plate 100, in this case to a bicycle 104 such as shown in FIG. 8. First of all, the support plate 100 preferably includes a plurality of apertures 130 therein through which support plate bolts 132 can be passed downward. The bolts 132 have sufficient length to extend through apertures 134 in the vehicle luggage rack 102 of the bicycle. The bolts 132 secure the support plate 100 to the luggage rack 136 through the use of matching nuts 138 and plate washers 139. The plate washers 139 are sized relatively large to provide sufficient stability to the assembly.

On the upper side of the support plate 100, one half of the latching structure is provided. In the illustrated embodiment, the latching structure includes a pair of latch hooks 140 at the front end, and a release pin 142 on the rear end. The bottom 76 of the container 70 features the other half of the latching structure; namely, a pair of latching fingers 144 at the front end for mating with the latch hooks 140, and a latching recess 146 at the rear end for receiving the release pin 142. As mentioned above, the container 70 preferably includes a latch control panel 94 on its front wall. The latch control panel 94 conceals and operates a latching mechanism within the recess 146 for locking on to the release pin 142. In this manner, the operator can use a key or other such actuator to unlock the container 70 from the support plate 100. In a preferred embodiment, the operator need only engage the latch fingers 144 on the container 70 with the latch hooks 140 on the support plate 100, and then pivot the rear end of the container downward until the release pin 142 engages a spring-loaded latch or other such device within the recess 146. To remove, the operator need only turn a key or lever to disengage the spring-loaded latch and lift up the rear end of the container 70.

It is important to emphasize that the pet carriers 60 described herein may be manufactured with unique support plates 100, or may utilize support plates that exist for other vehicle accessories such as top boxes. For example, the latching mechanism described above for U.S. Patent Publication No. 2011/0037277 and shown in FIGS. 1-5 can be utilized such that the container 70 mates with the support plate of a commercially-available top box; namely, the support plate 13 fixed to the motor vehicle as shown in FIG. 1. In this manner, a vehicle luggage carrier (e.g., top box) can be replaced with a pet carrier 60, and vice-versa, by simply removing the luggage carrier from the support plate and engaging the container 70 of the pet carrier. As a result, the system described herein can be coupled to any "support plate" from any top box or the like manufacturer, including, but not limited to: Givi S.R.L., Coocase, Bestem USA, and Piaggio & C. S.p.A. Additionally, and as will be shown below, the support plate or at least its function may be incorporated into any of the pet carriers described herein so that it may be mounted directly to the vehicle luggage rack or other such rigid support structure.

FIGS. 12 and 12A further illustrate details of an exemplary internal harness system 120. As seen in phantom in FIG. 12 and in more detail in FIG. 12A, the two straps 122 of the harness system 120 engage grommets 150 or other such fasteners mounted to the interior sidewalls of the container 70. In one embodiment, the grommets 150 include projecting eyeholes or U-shaped loops. In a preferred embodiment, the outer ends of the straps 122 include leash clips 152 or other such devices for removably attaching to the grommets 150. Further, the two straps 122 are secured at their middle ends and preferably attached to a ring 154 to which a collar clip 156 attaches. In this way, the harness system 120 can be secured on both sides within the container 70, and also to a collar or other restraint on the pet.

FIG. 13 is a perspective view of a clamshell-type container 70 which includes upper half 90 attached to the lower half 92 at hinges 160. A clamshell clasp 162 secures the two halves 90, 92 together. Preferably, the harness system 120 mounted within the lower half 92. Furthermore, the two halves 90, 92 may be decoupled in the same operation that the entire container 70 is detached from the support plate. Alternatively, locking of the two halves 90, 92 together can be done separately to the step of removing the container 70 from the support plate.

Other options for the pet carriers described herein include a compartment for a leash, a compartment for doggie waste bags, and personal storage space area for the pet owner. For instance, a compartment 170 is seen in FIG. 13 inside the lower half 92 of the clamshell container 70. This also serves to deter thieves who might be afraid of the pet while in the carrier 60.

Figure 14:
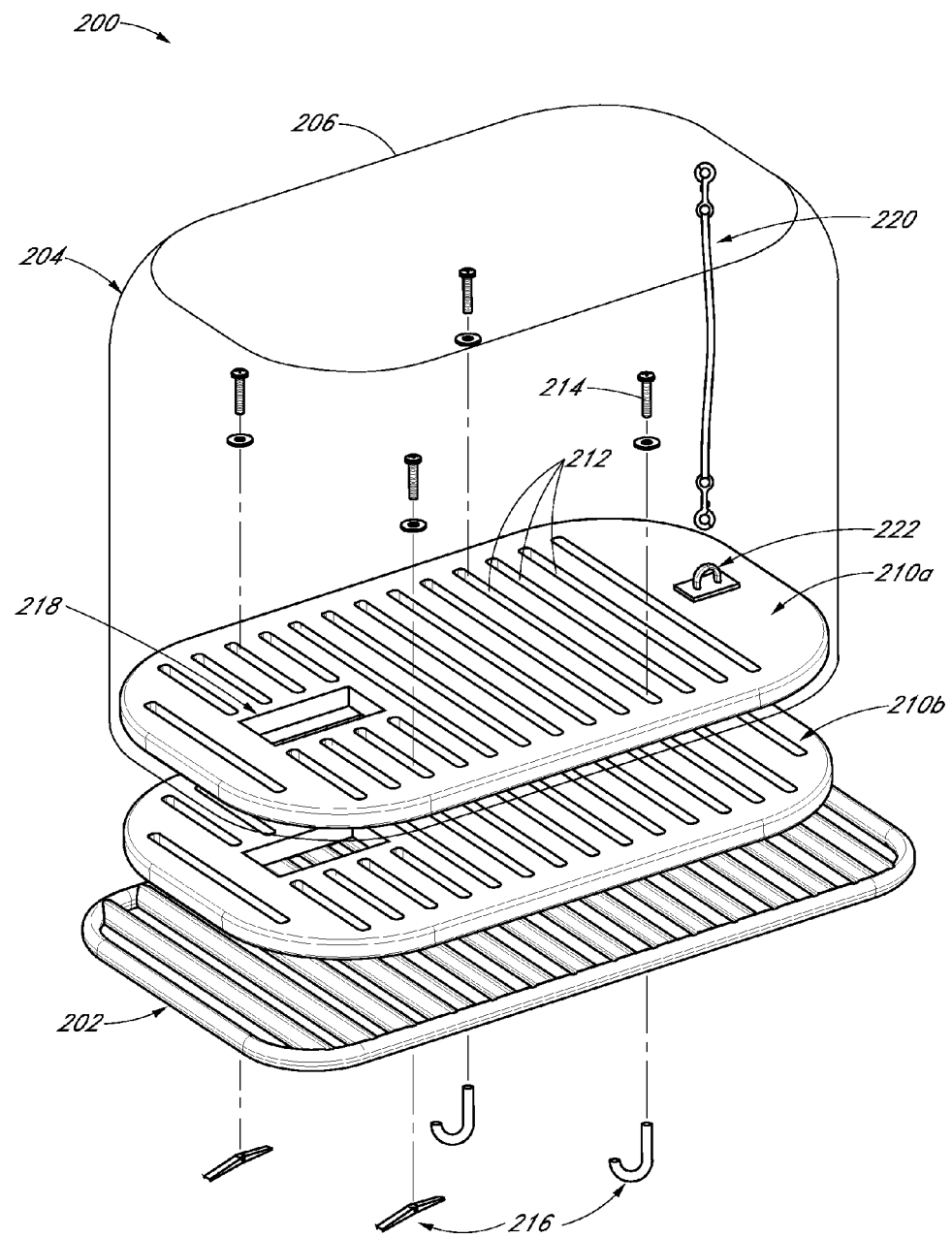
FIG. 14 is an exploded perspective view of an alternative configuration of a small animal carrier including mounting hardware for mounting directly to a vehicle luggage rack.

FIG. 14 illustrates an alternative configuration of a small animal carrier 200 including mounting hardware for mounting directly to a vehicle luggage rack 202. The carrier 200 may be constructed similar to those described above, and basically includes a container 204 with a bottom and surrounding walls, and an upper opening 206 which is preferably rimmed by padding. The container 204 is shown in phantom so that the anchoring structure for attaching to the luggage rack 202 is visible. The anchoring structure includes at least one and preferably two slotted plates, one plate 210a on the interior of the container 204 and a second plate 210b below the bottom of the container. The two plates 210 sandwich the bottom of the container in between and are connected together such as with adhesive, screws, or the like. The plates 210 rigidify the bottom of the container as well as providing a sturdy platform to which mounting hardware can be attached.

Both the plates 210 include a series of spaced lateral slots 212 distributed along the length of the plates. The slots 212 in the two plates 210 align so that bolts 214 can pass downward through the slots to extend below the luggage rack 202. Hardware such as drywall anchors, J-bolts or the like 216 is then attached to the bolts 214 below the luggage rack and tightened so that the entire structure is firmly held on the rack. Of course, other mounting hardware is contemplated, and the illustrated embodiment should not be considered limiting. The slots provide a wide array of positions to place the fastening hardware to match a multitude of vehicle luggage racks 202, but of course other apertures or hooks or the like could also be used. The term "anchoring structure" will therefore be used to encompass all manner of apertures or other structures for securing the bottom of the container 204 to a vehicle luggage rack or other such rigid support structure on the vehicle. Furthermore, a square hole 218 of approximately 2"×2" may be provided in the plates 210 and the bottom floor of the container 204 to allow access to any pre-existing top box mounting plate. In all of these configurations, a flat panel or padding is included within the container to cover the slots or other apertures so that the pet has a solid floor.

In an alternative configuration, any of the pet carriers described herein could attach to a quick-release seat-post-mounted luggage rack, such as available from REI. With such an assembly, the luggage rack itself could easily be removed so that the vehicle could be converted from one that accommodates a pet carrier to one that doesn't.

In one aspect, the present application provides a method for retrofitting an existing pet carrier so as to be mounted on a vehicle as described. For example, the container 204 may be an existing commercial pet carrier, such as a small or medium-sized dog carrier or litter box. The upper opening 206 needs to be formed in the top wall of the container 204, and preferably rimmed with padding. The two plates 210 which can be formed of plywood or similar material are positioned above and below the bottom floor of the pet carrier and secured together. Prior to attaching the plates 210, slots need to be cut in the bottom floor of the container 204 that align with the slots in the plates. A harness or tether system 220 is then attached on the interior of the container 204, such as by screwing grommets or eyeholes 222 into the wall of the container to which the harness attaches. Finally, the aforementioned bolts 214 and drywall anchors 216 are used to secure the assembly to a vehicle luggage rack 202.

FIGS. 15A-15D show a still further small animal carrier 230 having a clamshell configuration with an upper half 232 pivotally mounted about a lower half 234. The carrier 230 desirably includes a hinged door 236 for closing an upper opening 238 to convert between its use as an animal carrier and its use as a luggage box. The upper half 232 pivots relative to the lower half 234 about hinges 240 therebetween at a front end of the carrier 230. A lock 242 is desirably provided on the rear end of the carrier 230 to secure the clamshell closed.

Figure 15C:
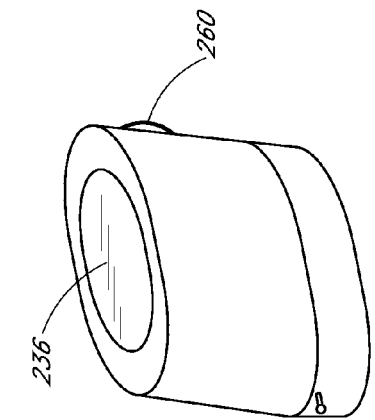
FIGS. 15A-15D are perspective views of a still further small animal carrier having an upper door for closing an upper opening to convert the animal carrier into a luggage box.
Figure 15D:
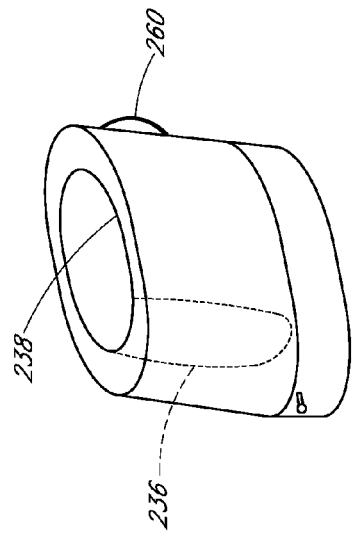
Figure 15A:
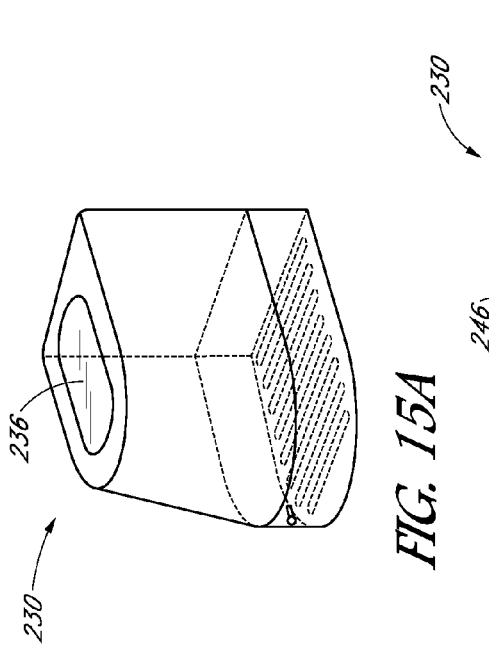
Figure 15B:
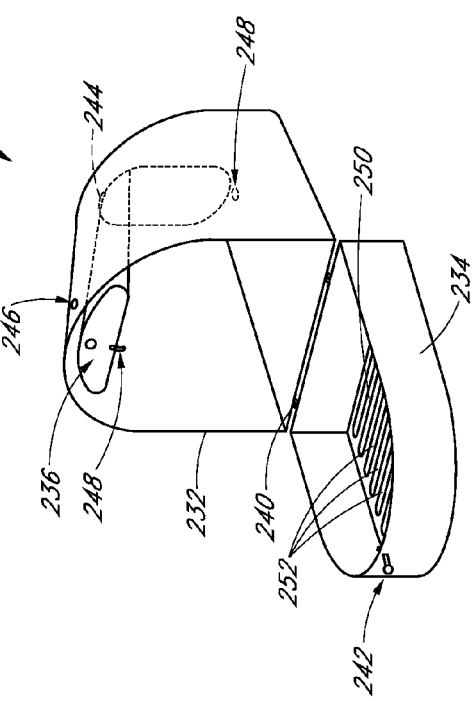

FIG. 15C shows the upper door 236 closed over the opening 238, while FIG. 15D shows the door open. As seen in FIG. 15B, the upper door 236 desirably pivots about a hinge 244 located at a rear edge of the opening 238, enabling it to be swung out of the way to the rear of the container so as to be out of the way of the pet within the carrier 230. Some form of securement such as opposed magnets 246 may be provided between the door 236 and the interior of the carrier 230 to maintain the door out of the way. Also, the door 236 can be closed and latched from the inside of the carrier 230, such as by providing cooperating latches 248.

In contrast to the pet carrier 220 illustrated in FIG. 14, the pet carrier to 30 is desirably molded of one or two separate pieces, with a reinforced floor 250 having a series of lateral slots 252 formed therein. The slots 252 provide through holes through which to pass fastening hardware to connect the pet carrier 230 to a vehicle luggage rack, as explained above. The slots 252 thus provide the "anchoring structure" securing the bottom of the animal carrier 230 to a vehicle luggage rack or other such rigid support structure on the vehicle. Preferably, the two halves 232, 234 are injection or rotational molded, or the entire assembly can be rotational molded in a single piece, although the benefit of having a clamshell configuration is lost.

One optional feature shown in FIGS. 15C and 15D is a seatbelt loop or opening 260 on the front end of the carrier 230. This provides the option of placing the pet carrier 230 on the seat in the interior of the vehicle and securing it thereon with a seatbelt. In this way, the pet can still ride within the container with his or her head sticking out of the opening 238, and the harness system (not shown) maintains the pet within the carrier.

FIGS. 16A-16D and 17A-17D are various views of another small animal carrier having a container 300 with an upper panel 302 assembled over an upper opening 304 so as to form a luggage box 306. More particularly, FIGS. 16A-16D show the panel 302 assembled so as to create the luggage box 306, while FIGS. 17A-17D show the panel removed to form a pet carrier 308. The panel 302 may be hinged inward, as described above, or may be entirely removable. In either configuration, the panel 302 is desirably latched or locked from the inside of the container 302 to prevent anyone from being able to pry or pick it free. FIGS. 18A-18D are various views of a lower half 310 of the container 300, while FIGS. 19A-19D show an upper half 312 of the container.

The container 300 includes hinge(s) 320 along a front edge between the lower half 310 and the upper half 312, thus creating a clamshell configuration. Of course, as mentioned above, the entire container 300 can be rotational molded so as to form a single piece, with the upper opening 304 providing the point of entry. In the clamshell configuration, a locking structure 322 on the rear edges between the upper and lower halves 310, 312 enables the user to secure the upper panel 302 in place and lock the luggage box 306.

Figure 18A:
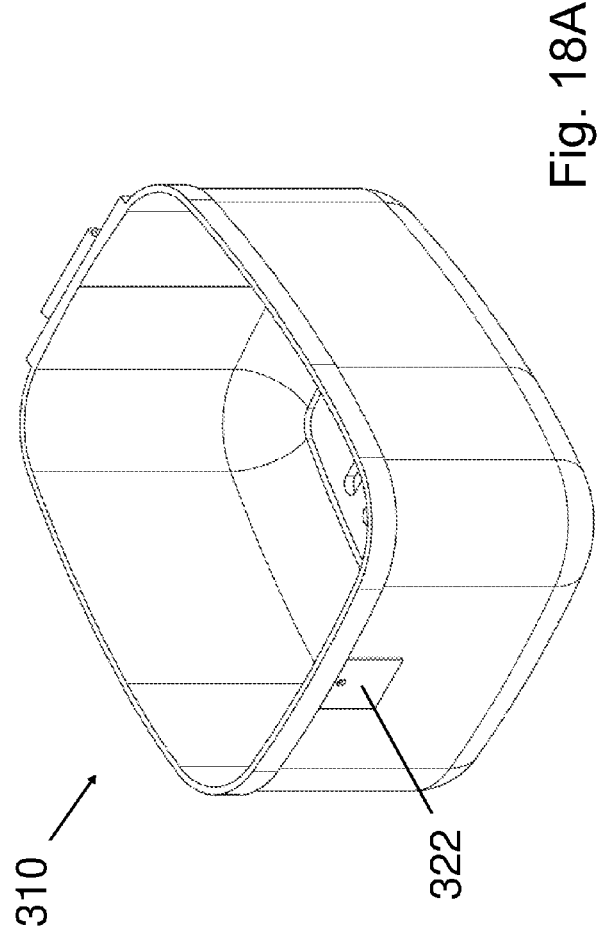
FIGS. 18A-18D are various views of a lower half of the small animal carrier of FIGS. 16A-16D.
Figure 18D:
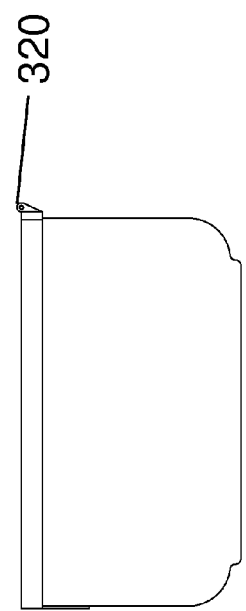
Figure 18B:
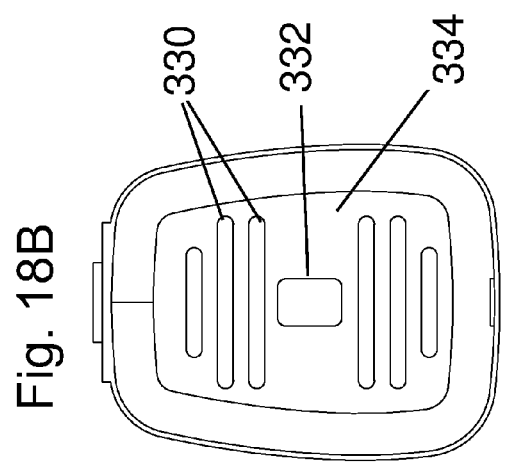
Figure 18C:
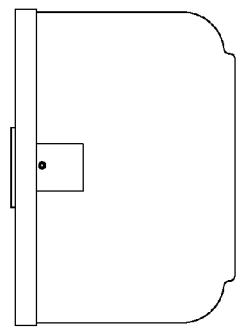

FIG. 18C illustrates a series of lateral slots 330 and a rectangular opening 332 in a bottom floor 334 of the lower half 310. The slots 330 provide passage for hardware which can be used to secure the container 300 to a vehicle luggage rack. The rectangular opening 332 enables coupling to an existing support plate, such as those described above for Top Boxes.

While the invention has been described in its preferred embodiments, it is to be understood that the words which have been used are words of description and not of limitation. Therefore, changes may be made within the appended claims without departing from the true scope of the invention.

What is claimed is:

1. An animal carrier for use with a vehicle that has a top box support plate secured thereto, the carrier comprising:
   a container having a bottom and sides sized to contain a small to medium dog and having a top with an upper opening defined by edges, wherein the upper opening has generally horizontal edges that extend inward from the sides all the way around a periphery of the opening to the edges thereof, and the edges are covered with padding;
   a latching structure on the container bottom adapted to detachably couple the container to the top box support plate and including a quick-release latch that permits a user to detach the carrier from the top box support plate by actuating the quick-release latch; and
   a closure detachable over the upper opening to convert the animal carrier to a luggage box.

2. The animal carrier of claim 1, wherein the container has a clamshell configuration with an upper half of the container pivotably mounted about a front edge of the upper half on a lower half of the container.

3. The animal carrier of claim 2, further including a locking structure between the upper and lower halves.

4. The animal carrier of claim 2, wherein the closure is a top panel detachably mounted within the upper opening, the panel being secured from the inside of the container.

5. The animal carrier of claim 1, further including a seatbelt loop on an exterior of the carrier enabling the carrier to be secured within a vehicle interior with a seatbelt.

6. The animal carrier of claim 1, wherein the upper opening has a size of at least half a horizontal dimension of the container in both width and length directions to permit the dog to extend its upper body out of the opening.

7. The animal carrier of claim 1, further including a harness attached within the container to restrain the dog from jumping completely out of the opening.

8. An animal carrier for use with a vehicle that has a top box support plate secured thereto, the carrier comprising:
   a container having a bottom and sides sized to contain a small to medium dog and having a top with an upper opening defined by edges;
   a latching structure on the container bottom adapted to detachably couple the container to the top box support plate and including a quick-release latch that permits a user to detach the carrier from the top box support plate by actuating the quick-release latch; and
   a closure detachable over the upper opening to convert the animal carrier to a luggage box, wherein the closure is a top panel detachably mounted within the upper opening, the panel being secured from inside of the container.

9. The animal carrier of claim 8, wherein the container has a clamshell configuration with an upper half of the container pivotably mounted about a front edge of the upper half on a lower half of the container.

10. The animal carrier of claim 9, further including a locking structure between the upper and lower halves.

11. The animal carrier of claim 8, further including a seatbelt loop on an exterior of the carrier enabling the carrier to be secured within a vehicle interior with a seatbelt.

12. The animal carrier of claim 8, wherein the upper opening has a size of at least half a horizontal dimension of the container in both width and length directions to permit the dog to extend its upper body out of the opening.

13. The animal carrier of claim 8, further including a harness attached within the container to restrain the dog from jumping completely out of the opening.

14. The animal carrier of claim 8, wherein the upper opening has generally horizontal edges that extend inward from the sides all the way around a periphery of the opening to the edges thereof, and the edges are covered with padding.

* * * * *